US012810283B2

(12) United States Patent
Rule et al.

(10) Patent No.: US 12,810,283 B2
(45) Date of Patent: Nov. 24, 2026

(54) TAP TO PAY CREDIT BILL

(71) Applicant: Capital One Services, LLC, McLean, VA (US)

(72) Inventors: Jeffrey Rule, Chevy Chase, MD (US); Clayton Johnson, Edgewood, MD (US)

(73) Assignee: Capital One Services, LLC, McLean, VA (US)

( * ) Notice: Subject to any disclaimer, the term of this patent is extended or adjusted under 35 U.S.C. 154(b) by 317 days.

(21) Appl. No.: 17/889,959

(22) Filed: Aug. 17, 2022

(65) Prior Publication Data

US 2023/0045349 A1 Feb. 9, 2023

Related U.S. Application Data

(63) Continuation of application No. 16/863,658, filed on Apr. 30, 2020, now Pat. No. 11,455,606.

(51) Int. Cl.

*G06Q 20/32* (2012.01)
*G06Q 20/12* (2012.01)
*G06Q 20/14* (2012.01)
*G06Q 20/24* (2012.01)
(Continued)

(52) U.S. Cl.

CPC ........... *G06Q 20/382* (2013.01); *G06Q 20/12* (2013.01); *G06Q 20/14* (2013.01); *G06Q 20/24* (2013.01); *G06Q 20/3226* (2013.01); *G06Q 20/3278* (2013.01); *G06Q 20/353* (2013.01)

(58) Field of Classification Search

CPC ...... G06Q 20/382; G06Q 20/12; G06Q 20/14; G06Q 20/24; G06Q 20/3226; G06Q 20/3278; G06Q 20/353
See application file for complete search history.

(56) References Cited

U.S. PATENT DOCUMENTS

| | | | |
|---|---|---|---|
| 5,590,038 | A | 12/1996 | Pitroda |
| 5,666,415 | A | 9/1997 | Kaufman |
| 6,199,114 | B1 | 3/2001 | White |

(Continued)

FOREIGN PATENT DOCUMENTS

| | | | |
|---|---|---|---|
| CN | 101192295 | A | 6/2008 |
| CN | 103559756 | A | 2/2014 |

(Continued)

OTHER PUBLICATIONS

US Payments Forum "EMV Payment Tokenization Primer and Lessons Learned," Jun. 2019, https://www.uspaymentsforum.org/wp-content/uploads/2019/06/EMV-Payment-Tokenization-Primer-Lessons-Learned-FINAL-June-2019.pdf. (Year: 2019).*

(Continued)

*Primary Examiner* — Patrick Mcatee
*Assistant Examiner* — Scott Michael Diroma
(74) *Attorney, Agent, or Firm* — KDW Firm PLLC

(57) ABSTRACT

Various embodiments are directed to enhancing a card payment experience by a single tap of a contactless card to a user computing device. In examples, the single tap of the card may be preconfigured to cause automatic payment of a predefined amount toward a card balance. If the single tap is not preconfigured to mean automatic card payment, the user may be presented with a notification and various payment amount options, which the user can select to pay toward the card balance.

20 Claims, 11 Drawing Sheets

(51) Int. Cl.
*G06Q 20/34* (2012.01)
*G06Q 20/38* (2012.01)

(56) References Cited

U.S. PATENT DOCUMENTS

| | | | | |
|---|---|---|---|---|
| 6,324,271 | B1 | 11/2001 | Sawyer | |
| 6,367,011 | B1 | 4/2002 | Lee | |
| 6,572,015 | B1 | 6/2003 | Norton | |
| 7,252,242 | B2 | 8/2007 | Ho | |
| 7,270,276 | B2 | 9/2007 | Vayssiere | |
| 7,287,692 | B1 | 10/2007 | Patel | |
| 7,374,099 | B2 | 5/2008 | de Jong | |
| 7,527,208 | B2 | 5/2009 | Hammad | |
| 7,568,631 | B2 | 8/2009 | Gibbs | |
| 7,584,153 | B2 | 9/2009 | Brown | |
| 7,628,322 | B2 | 12/2009 | Holtmanns | |
| 7,793,851 | B2 | 9/2010 | Mullen | |
| 7,801,799 | B1 | 9/2010 | Brake, Jr. | |
| 7,908,216 | B1 | 3/2011 | Davis | |
| 7,922,082 | B2 | 4/2011 | Muscato | |
| 8,010,405 | B1 | 8/2011 | Bortolin | |
| 8,074,877 | B2 | 12/2011 | Mullen | |
| 8,082,450 | B2 | 12/2011 | Frey | |
| 8,108,687 | B2 | 1/2012 | Ellis | |
| 8,186,602 | B2 | 5/2012 | Itay | |
| 8,196,131 | B1 | 6/2012 | Von Behren | |
| 8,249,654 | B1 | 8/2012 | Zhu | |
| 8,276,814 | B1 | 10/2012 | Davis | |
| 8,332,272 | B2 | 12/2012 | Fisher | |
| 8,346,670 | B2 | 1/2013 | Hasson | |
| 8,511,547 | B2 | 8/2013 | Rans | |
| 8,519,822 | B2 | 8/2013 | Riegebauer | |
| 8,750,514 | B2 | 6/2014 | Gallo | |
| 8,870,081 | B2 | 10/2014 | Olson | |
| 9,038,893 | B2 | 5/2015 | Kirkham | |
| 9,129,199 | B2 | 9/2015 | Spodak | |
| 9,183,490 | B2 | 11/2015 | Moreton | |
| 9,275,325 | B2 | 3/2016 | Newcombe | |
| 9,286,606 | B2 | 3/2016 | Diamond | |
| 9,306,753 | B1 | 4/2016 | Vandervort | |
| 9,501,776 | B2 | 11/2016 | Martin | |
| 9,710,744 | B2 | 7/2017 | Wurmfeld | |
| 9,949,065 | B1 | 4/2018 | Zarakas | |
| 9,965,632 | B2 | 5/2018 | Zarakas | |
| 9,965,911 | B2 | 5/2018 | Wishne | |
| 9,977,890 | B2 | 5/2018 | Alberti | |
| 9,978,056 | B2 | 5/2018 | Seo | |
| 9,978,058 | B2 | 5/2018 | Wurmfeld | |
| 9,990,795 | B2 | 6/2018 | Wurmfeld | |
| 10,007,873 | B2 | 6/2018 | Heo | |
| 10,013,693 | B2 | 7/2018 | Wyatt | |
| 10,121,130 | B2 | 11/2018 | Pinski | |
| 10,210,505 | B2 | 2/2019 | Zarakas | |
| 10,242,368 | B1 | 3/2019 | Poole | |
| 10,296,910 | B1 | 5/2019 | Templeton | |
| 10,332,102 | B2 | 6/2019 | Zarakas | |
| 10,360,557 | B2 | 7/2019 | Locke | |
| 10,380,471 | B2 | 8/2019 | Locke | |
| 10,395,244 | B1 | 8/2019 | Mossler | |
| 10,453,054 | B2 | 10/2019 | Zarakas | |
| 10,467,622 | B1 | 11/2019 | Rule et al. | |
| 10,474,941 | B2 | 11/2019 | Wurmfeld | |
| 10,475,027 | B2 | 11/2019 | Guise | |
| 10,482,453 | B2 | 11/2019 | Zarakas | |
| 10,482,457 | B2 | 11/2019 | Poole | |
| 10,489,774 | B2 | 11/2019 | Zarakas | |
| 10,489,781 | B1 | 11/2019 | Osborn | |
| 10,510,070 | B2 | 12/2019 | Wurmfeld | |
| 10,515,361 | B2 | 12/2019 | Zarakas | |
| 10,535,068 | B2 | 1/2020 | Locke | |
| 10,546,444 | B2 | 1/2020 | Osborn | |
| 10,581,611 | B1 | 3/2020 | Osborn | |
| 10,664,830 | B1 | 5/2020 | Rule | |
| 10,685,349 | B2 | 6/2020 | Brickell | |
| 10,797,882 | B2 | 10/2020 | Rule | |

| | | | | |
|---|---|---|---|---|
| 10,880,741 | B2 | 12/2020 | Zarakas | |
| 10,909,525 | B1 | 2/2021 | Dhodapkar | |
| 10,970,691 | B2 | 4/2021 | Koeppel | |
| 10,984,416 | B2 | 4/2021 | Ilincic | |
| 11,037,136 | B2 | 6/2021 | Rule | |
| 11,062,098 | B1 | 7/2021 | Bergeron | |
| 11,120,453 | B2 | 9/2021 | Rule | |
| 11,138,593 | B1 | 10/2021 | Ho | |
| 11,138,605 | B2 | 10/2021 | Aabye | |
| 11,176,540 | B2 | 11/2021 | Gupta | |
| 11,188,908 | B2 | 11/2021 | Locke | |
| 11,216,806 | B2 | 1/2022 | Mossler | |
| 11,297,958 | B2 | 4/2022 | Vukich | |
| 11,334,872 | B2 | 5/2022 | Phillips | |
| 11,361,173 | B2 | 6/2022 | Edwards | |
| 11,392,933 | B2 | 7/2022 | Mossler | |
| 11,392,935 | B2 | 7/2022 | Suresh | |
| 11,410,153 | B1 * | 8/2022 | Zhang | G06Q 20/327 |
| 11,416,844 | B1 | 8/2022 | Osterkamp | |
| 11,423,392 | B1 | 8/2022 | Ho | |
| 11,443,292 | B2 | 9/2022 | Sherif | |
| 11,444,770 | B2 | 9/2022 | Wieker | |
| 11,461,764 | B2 | 10/2022 | Rule | |
| 11,481,764 | B2 | 10/2022 | Shakkarwar | |
| 11,521,213 | B2 | 12/2022 | Rule | |
| 11,551,200 | B1 * | 1/2023 | Cook | G06Q 20/3226 |
| 11,556,918 | B2 | 1/2023 | Mestre | |
| 11,615,395 | B2 * | 3/2023 | McHugh | G06Q 20/3672 705/67 |
| 11,777,933 | B2 | 10/2023 | Moreton | |
| 11,861,590 | B1 * | 1/2024 | Quigley | G06Q 20/352 |
| 2003/0220876 | A1 | 11/2003 | Burger | |
| 2005/0156026 | A1 | 7/2005 | Ghosh | |
| 2005/0228997 | A1 | 10/2005 | Bicker | |
| 2005/0269402 | A1 | 12/2005 | Spitzer | |
| 2006/0074799 | A1 * | 4/2006 | Averyt | G07F 7/0873 705/40 |
| 2007/0276765 | A1 | 11/2007 | Hazel | |
| 2008/0082452 | A1 | 4/2008 | Wankmueller | |
| 2008/0099552 | A1 | 5/2008 | Grillion | |
| 2009/0143104 | A1 | 6/2009 | Loh | |
| 2009/0235339 | A1 | 9/2009 | Mennes | |
| 2009/0282264 | A1 | 11/2009 | Amiel | |
| 2011/0113245 | A1 | 5/2011 | Varadarajan | |
| 2011/0155801 | A1 | 6/2011 | Rowberry | |
| 2012/0143703 | A1 | 6/2012 | Wall | |
| 2012/0310826 | A1 | 12/2012 | Chatterjee | |
| 2013/0030997 | A1 | 1/2013 | Spodak | |
| 2013/0146657 | A1 | 6/2013 | Graef | |
| 2013/0211937 | A1 | 8/2013 | Elbirt | |
| 2013/0311363 | A1 | 11/2013 | Ramaci | |
| 2014/0006188 | A1 * | 1/2014 | Grigg | G07F 9/009 705/17 |
| 2014/0074637 | A1 | 3/2014 | Hammad | |
| 2014/0074655 | A1 | 3/2014 | Lim | |
| 2014/0081785 | A1 | 3/2014 | Valadas Preto | |
| 2014/0365377 | A1 | 12/2014 | Salama | |
| 2015/0032635 | A1 | 1/2015 | Guise | |
| 2015/0073983 | A1 | 3/2015 | Bartenstein | |
| 2015/0113271 | A1 | 4/2015 | Jooste | |
| 2015/0134513 | A1 | 5/2015 | Olson | |
| 2015/0199673 | A1 | 7/2015 | Savolainen | |
| 2015/0199863 | A1 | 7/2015 | Scoggins | |
| 2015/0254637 | A1 | 9/2015 | Yang | |
| 2015/0262180 | A1 * | 9/2015 | Hambleton | G06Q 20/3821 705/44 |
| 2015/0317295 | A1 | 11/2015 | Sherry | |
| 2015/0371202 | A1 | 12/2015 | Song | |
| 2016/0078430 | A1 | 3/2016 | Douglas | |
| 2016/0132867 | A1 * | 5/2016 | Raja | G06Q 20/22 705/16 |
| 2016/0189143 | A1 | 6/2016 | Koeppel | |
| 2016/0253651 | A1 | 9/2016 | Park | |
| 2016/0277383 | A1 | 9/2016 | Guyomarc'h | |
| 2016/0307189 | A1 | 10/2016 | Zarakas | |
| 2016/0314472 | A1 | 10/2016 | Ashfield | |
| 2016/0379217 | A1 | 12/2016 | Hammad | |
| 2017/0017957 | A1 | 1/2017 | Radu | |
| 2017/0039566 | A1 | 2/2017 | Schipperheijn | |

(56) References Cited

U.S. PATENT DOCUMENTS

| | | | | |
|---|---|---|---|---|
| 2017/0068950 | A1 | 3/2017 | Kwon | |
| 2017/0116596 | A1* | 4/2017 | Tsui | G06Q 20/4012 |
| 2017/0330173 | A1 | 11/2017 | Woo | |
| 2018/0039987 | A1 | 2/2018 | Molino | |
| 2018/0082298 | A1* | 3/2018 | Modi | G06Q 20/2295 |
| 2018/0268132 | A1 | 9/2018 | Buer | |
| 2018/0300716 | A1 | 10/2018 | Carlson | |
| 2018/0316687 | A1* | 11/2018 | Hribovsek | H04L 63/0807 |
| 2019/0172055 | A1 | 6/2019 | Hale | |
| 2019/0303945 | A1 | 10/2019 | Mitra | |
| 2021/0004806 | A1 | 1/2021 | Noe | |
| 2021/0103914 | A1* | 4/2021 | Pinniboyina | G07F 7/0813 |
| 2021/0110441 | A1* | 4/2021 | Mayer | G06Q 30/0279 |
| 2021/0272098 | A1 | 9/2021 | Delsuc | |
| 2021/0304189 | A1 | 9/2021 | Gupta | |
| 2021/0383360 | A1 | 12/2021 | Sinha | |
| 2021/0406869 | A1 | 12/2021 | Pathrabe | |
| 2022/0114581 | A1 | 4/2022 | Upadhye | |
| 2022/0284416 | A1 | 9/2022 | Rule | |
| 2022/0309509 | A1 | 9/2022 | Akgun | |
| 2022/0335412 | A1 | 10/2022 | Rule | |
| 2022/0366410 | A1 | 11/2022 | Rule | |
| 2022/0398566 | A1 | 12/2022 | Rule | |
| 2022/0414648 | A1 | 12/2022 | Rule | |
| 2023/0054157 | A1 | 2/2023 | Mao | |
| 2023/0065163 | A1 | 3/2023 | Vargas | |
| 2023/0083785 | A1 | 3/2023 | Maiman | |
| 2023/0169505 | A1 | 6/2023 | Rule | |
| 2023/0354020 | A1 | 11/2023 | Rule | |
| 2023/0359839 | A1 | 11/2023 | Lovgren | |

FOREIGN PATENT DOCUMENTS

| | | | |
|---|---|---|---|
| GB | 2516861 | A | 2/2015 |
| GB | 2551907 | A | 1/2018 |
| JP | 2002099849 | A | 4/2002 |
| KR | 20100131413 | A | 12/2010 |
| KR | 20150140132 | A | 12/2015 |
| WO | 9910824 | A1 | 3/1999 |
| WO | 0049586 | A1 | 8/2000 |
| WO | 2013155562 | A1 | 10/2013 |
| WO | 2015183818 | A1 | 12/2015 |
| WO | 2017047855 | A1 | 3/2017 |
| WO | 2019022585 | A1 | 1/2019 |
| WO | 2020072575 | A1 | 4/2020 |
| WO | 2021051884 | A1 | 3/2021 |
| WO | 2021133492 | A1 | 7/2021 |
| WO | 2022108959 | A1 | 5/2022 |
| WO | 2022187350 | A1 | 9/2022 |
| WO | 2023017943 | A1 | 2/2023 |
| WO | 2023064063 | A1 | 4/2023 |

OTHER PUBLICATIONS

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author Unknown, "Global expansion of card tapping mobile OTP for security and convenience is imminent," Jun. 28, 2022, website: https://www.swidch.com/blogs/card-tapping-motp-blog.

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author unknown, "EMV Card Personalization Specification", EMVCo., LLC., specification version 1.0, (2003) 81 pages.

Author Unknown, "EMV Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Batina et al., "SmartCards and RFID", PowerPoint Presentation for IPA Security Course, Digital Security at University of Nijmegen, Netherlands. Retrieved from Internet URL: https://www.cs.ru.nl/E.Poll/teaching/ipa_smartcards.pdf, available on at least Jun. 2, 2019 per Internet Archives, https://web.archive.org/, 75 pages.

Emvco: "EMV Card Personalisation Specification", Aug. 1, 2021, pp. 1-114, Retrieved from the Internet: URL: https://www.emvco.com/specification/?post_id=12467.

Faraj, S.T., et al., "Investigation of Java Smart Card Technology for Multi-Task Applications", J of Al-Anbar University for Pure Science, 2(1):23 pages (2008).

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Pourghomi, P., et al., "A Proposed NFC Payment Application," International Journal of Advanced Computer Science and Applications, 4(8):173-181 (2013).

Saush, "Getting information from an EMV chip card with Java," Sep. 8, 2006, WordPress, pp. 1-13.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Smart Card Alliance, "Co-Branded Multi-Application Contactless Cards for Transit and Financial Payment," A Smart Card Alliance Transportation Council White Paper (40 pages), Mar. 2008.

Ullmann et al., "On-Card" User Authentication for Contactless Smart Cards based on Gesture Recognition, paper presentation LNI proceedings, (2012) 12 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

* cited by examiner

TAP TO PAY CREDIT BILL

CROSS-REFERENCE TO RELATED APPLICATIONS

This application is a continuation of U.S. patent application Ser. No. 16/863,658, entitled "TAP TO PAY A CREDIT BILL VIA A COMPUTING DEVICE" filed on Apr. 30, 2020. The contents of the aforementioned application are incorporated herein by reference in their entirety.

BACKGROUND

When a customer uses a credit card or any other type of payment card, the customer is required to make a payment on the balance of the card after a predefined time period, e.g., typically the following month. In some examples, the customer may mail in paper payments to pay the monthly credit payment. In other examples, the customer may manually login to the credit card issuer's banking interface and make online payments every month. In yet other examples, the credit card issuer may allow the customer to set up automatic online payments to occur on specified dates. In the above examples, however, the payment and autopay setup processes are cumbersome and create friction between the customer and the bill payment experience.

SUMMARY

Various embodiments are directed to enhancing a card payment experience by a single tap of a contactless card to a user computing device. In examples, the single tap of the card may be preconfigured to cause automatic payment of a predefined amount toward a card balance. If the single tap is not preconfigured to mean automatic card payment, the user may be presented with a notification and various payment amount options, which the user can select to pay toward the card balance.

DETAILED DESCRIPTION

Figure 1A:
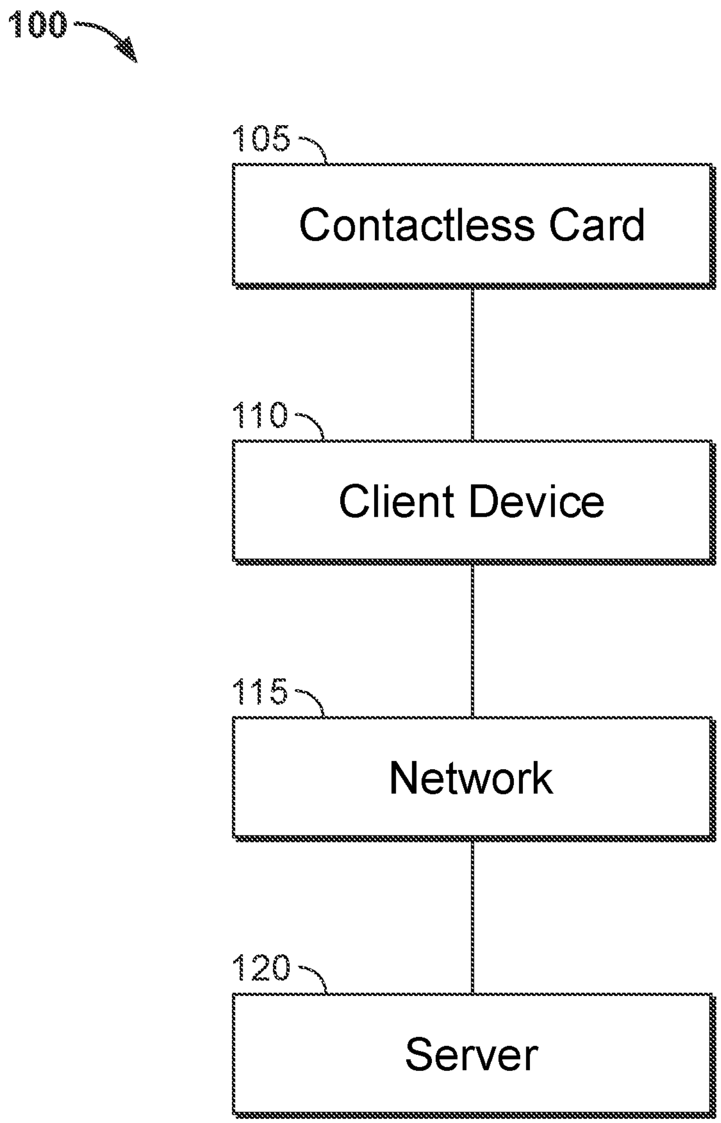
FIG. 1A illustrates an example data transmission system in accordance with one or more embodiments.

Various embodiments are generally directed to enhancing the card bill payment experience with a single tap or "one-tap" of a contactless card. The payment experience may otherwise be referred to herein as "one-tap bill pay." It may be understood that the term "card" referred to herein can broadly encompass all sorts of payment cards, e.g., credit card, charge card, virtual card, debit card, etc. It may also be understood that the contactless card may be linked or otherwise correspond to a card account.

In embodiments, a user (e.g., customer) may make a payment on at least a portion of a card balance by tapping a contactless card to the user's mobile device (e.g., smartphone). When the contactless card is placed in a magnetic field of a near field communication (NFC) reader of the mobile device, the contactless card may generate and transmit a uniform resource locator (URL) and an authentication payload (e.g., authentication code, cryptogram) to the mobile device. The URL may be used to communicate with an application programming interface (API) endpoint to authenticate the user based on the received authentication payload. Upon successful authentication of the user, a predefined payment (e.g., an amount preconfigured by the user) may be applied to the credit balance. If it is determined that the one-tap payment option has not yet been set up, the user's contact information may be identified and a message (e.g., e-mail, text) may be sent to the user. In response, the user may send a simple reply message with a payment selection (e.g., monthly minimum payment, fixed amount, full balance payment).

In further embodiments, the one-tap bill payment can be performed within a banking application (or otherwise referred to as "banking app"). One of the advantages of performing one-tap bill payment in the banking app is that it adds an additional layer of security and authentication (e.g., the user has to login to the banking app). Moreover, the banking app allows the user to set up and store one or more payment preferences (e.g., pay minimum, pay half of balance, pay full balance, pay balance of previous month). Further, the banking app may provide an improved user interactive experience of signaling that the transaction was completed and successful.

In previous solutions, making payments on a card balance was an unengaging and burdensome process. The user either had to mail in paper payments or manually login to an electronic account and specify and submit payment information. The embodiments and examples described herein overcome and are advantageous over the previous solutions in that a user can experience card payment in new, engaging, and exciting ways, such as allowing the user to make a predefined payment by simply tapping the card only once to the user's mobile device (which may otherwise be referred to herein as a one-tap bill pay experience). Moreover, in the banking app, the user may customize the one-tap bill pay experience.

Reference is now made to the drawings, where like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1A illustrates an example data transmission system according to one or more embodiments. As further discussed below, system 100 may include contactless card 105, client device 110, network 115, and server 120. Although FIG. 1A illustrates single instances of the components, system 100 may include any number of components.

System 100 may include one or more contactless cards 105, which are further explained below with reference to FIG. 3A and FIG. 3B. In some embodiments, contactless card 105 may be in wireless communication, utilizing NFC in an example, with client device 110.

System 100 may include client device 110, which may be a network-enabled computer. As referred to herein, a network-enabled computer may include, but is not limited to a computer device, or communications device including, e.g., a server, a network appliance, a personal computer, a workstation, a phone, a smartphone, a handheld PC, a personal digital assistant, a thin client, a fat client, an Internet browser, or other device. Client device 110 also may be a mobile computing device, for example, an iPhone, iPod, iPad from Apple® or any other suitable device running Apple's iOS® operating system, any device running Microsoft's Windows® Mobile operating system, any device running Google's Android® operating system, and/or any other suitable mobile computing device, such as a smartphone, a tablet, or like wearable mobile device.

The client device 110 device can include a processor and a memory, and it is understood that the processing circuitry may contain additional components, including processors, memories, error and parity/CRC checkers, data encoders, anti-collision algorithms, controllers, command decoders, security primitives and tamper-proofing hardware, as necessary to perform the functions described herein. The client device 110 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

In some examples, client device 110 of system 100 may execute one or more applications, such as software applications, that enable, for example, network communications with one or more components of system 100 and transmit and/or receive data.

Client device 110 may be in communication with one or more servers 120 via one or more networks 115 and may operate as a respective front-end to back-end pair with server 120. Client device 110 may transmit, for example from a mobile device application executing on client device 110, one or more requests to server 120. The one or more requests may be associated with retrieving data from server 120. Server 120 may receive the one or more requests from client device 110. Based on the one or more requests from client device 110, server 120 may be configured to retrieve the requested data from one or more databases (not shown). Based on receipt of the requested data from the one or more databases, server 120 may be configured to transmit the received data to client device 110, the received data being responsive to one or more requests.

System 100 may include one or more networks 115. In some examples, network 115 may be one or more of a wireless network, a wired network or any combination of wireless network and wired network and may be configured to connect client device 110 to server 120. For example, network 115 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 115 may include, without limitation, telephone lines, fiber optics, IEEE Ethernet 802.3, a wide area network, a wireless personal area network, a LAN, or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices. Although network 115 is depicted as a single network, it should be appreciated that according to one or more examples, network 115 may include a plurality of interconnected networks, such as, for example, the Internet, a service provider's network, a cable television network, corporate networks, such as credit card association networks, and home networks.

System 100 may include one or more servers 120. In some examples, server 120 may include one or more processors, which are coupled to memory. Server 120 may be configured as a central system, server or platform to control and call various data at different times to execute a plurality of workflow actions. Server 120 may be configured to connect to the one or more databases. Server 120 may be connected to at least one client device 110.

Figure 1B:
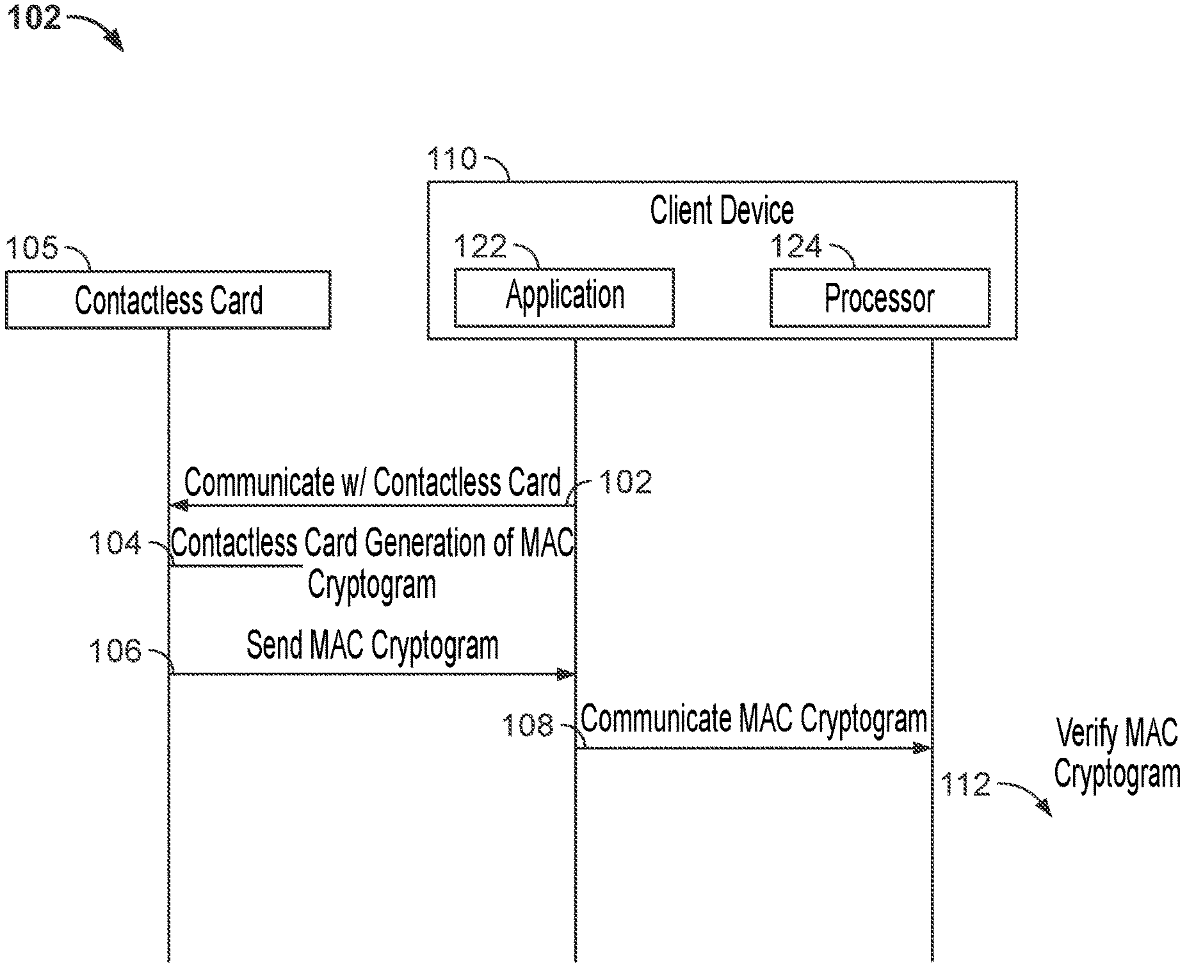
FIG. 1B illustrates an example sequence diagram for providing authenticated access in accordance with one or more embodiments.

FIG. 1B illustrates an example sequence diagram for providing authenticated access according to one or more embodiments. The diagram may include contactless card 105 and client device 110, which may include an application 122 and processor 124. FIG. 1B may reference similar components as illustrated in FIG. 1A.

At step 102, the application 122 communicates with the contactless card 105 (e.g., after being brought near the contactless card 105). Communication between the application 122 and the contactless card 105 may involve the contactless card 105 being sufficiently close to a card reader (not shown) of the client device 110 to enable NFC data transfer between the application 122 and the contactless card 105.

At step 104, after communication has been established between client device 110 and contactless card 105, the contactless card 105 generates a message authentication code (MAC) cryptogram. In some examples, this may occur when the contactless card 105 is read by the application 122. In particular, this may occur upon a read, such as an NFC read, of a near field data exchange (NDEF) tag, which may be created in accordance with the NFC Data Exchange Format.

For example, a reader, such as application 122, may transmit a message, such as an applet select message, with the applet ID of an NDEF producing applet. Upon confirmation of the selection, a sequence of select file messages followed by read file messages may be transmitted. For example, the sequence may include "Select Capabilities file," "Read Capabilities file," and "Select NDEF file." At this point, a counter value maintained by the contactless card 105 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples the MAC cryptogram may be included with a uniform resource indicator (e.g., as a formatted string).

In some examples, application 122 may be configured to transmit a request to contactless card 105, the request comprising an instruction to generate a MAC cryptogram.

At step 106, the contactless card 105 sends the MAC cryptogram to the application 122. In some examples, the transmission of the MAC cryptogram occurs via NFC, however, the present disclosure is not limited thereto. In other examples, this communication may occur via Bluetooth, Wi-Fi, or other means of wireless data communication.

At step 108, the application 122 communicates the MAC cryptogram to the processor 124. At step 112, the processor 124 verifies the MAC cryptogram pursuant to an instruction from the application 122. For example, the MAC cryptogram may be verified, as explained below.

In some examples, verifying the MAC cryptogram may be performed by a device other than client device 110, such as a server 120 in data communication with the client device 110 (as shown in FIG. 1A). For example, processor 124 may output the MAC cryptogram for transmission to server 120, which may verify the MAC cryptogram.

In some examples, the MAC cryptogram may function as a digital signature for purposes of verification. Other digital signature algorithms, such as public key asymmetric algorithms, e.g., the Digital Signature Algorithm and the RSA algorithm, or zero knowledge protocols, may be used to perform this verification.

It may be understood that in some examples, the contactless card 105 may initiate communication after the contactless card is brought near the client device 110. By way of example, the contactless card 105 may send the client device 110 a message, for instance, indicating that the contactless card has established communication. Thereafter, the application 122 of client device 110 may proceed to communicate with the contactless card at step 102, as described above.

Figure 2:
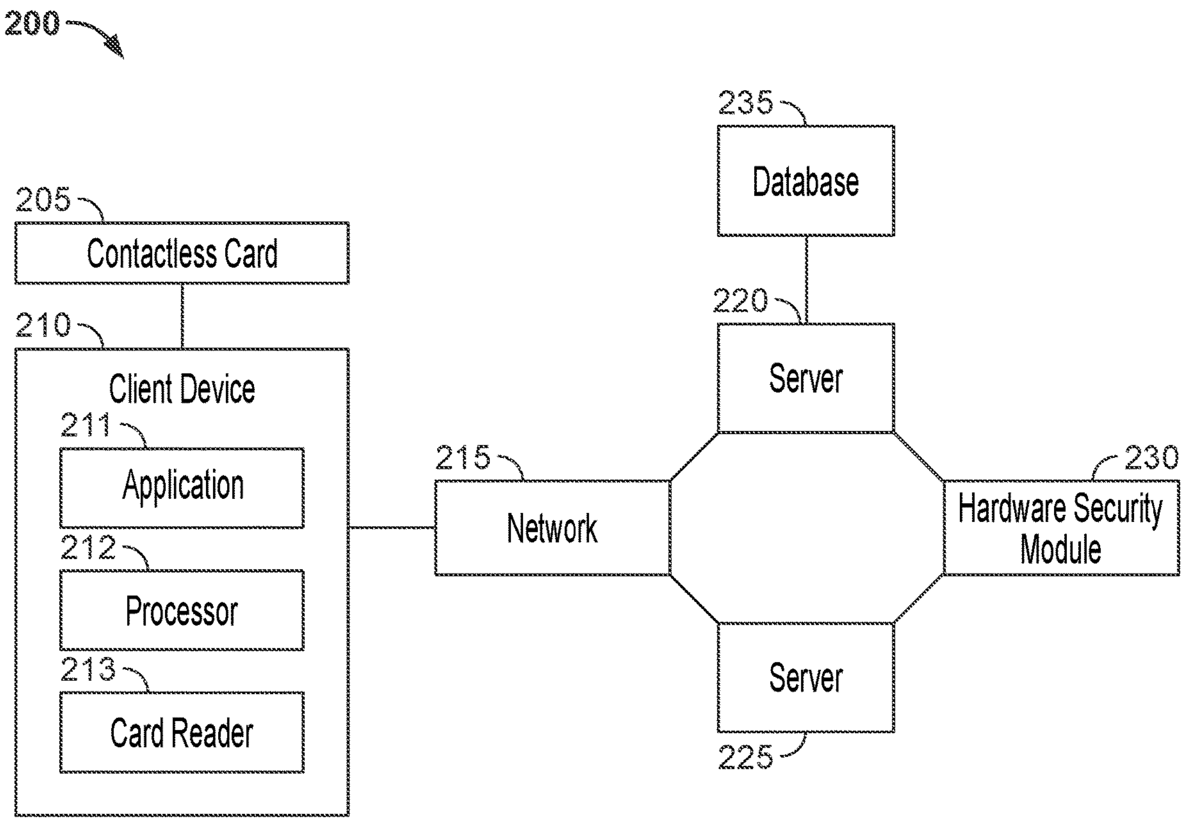
FIG. 2 illustrates an example system using a contactless card in accordance with one or more embodiments.

FIG. 2 illustrates an example system 200 using a contactless card. System 200 may include a contactless card 205, one or more client devices 210, network 215, servers 220, 225, one or more hardware security modules 230, and a database 235. Although FIG. 2 illustrates single instances of the components, system 200 may include any number of components.

System 200 may include one or more contactless cards 205, which are further explained below with respect to FIG. 3A and FIG. 3B. In some examples, contactless card 205 may be in wireless communication, for example NFC communication, with client device 210. For example, contactless card 205 may include one or more chips, such as a radio frequency identification chip, configured to communication via NFC or other short-range protocols. In other embodiments, contactless card 205 may communicate with client device 210 through other means including, but not limited to, Bluetooth, satellite, Wi-Fi, wired communications, and/or any combination of wireless and wired connections. According to some embodiments, contactless card 205 may be configured to communicate with card reader 213 (which may otherwise be referred to herein as NFC reader, NFC card reader, or reader) of client device 210 through NFC when contactless card 205 is within range of card reader 213. In other examples, communications with contactless card 205 may be accomplished through a physical interface, e.g., a universal serial bus interface or a card swipe interface.

System 200 may include client device 210, which may be a network-enabled computer. As referred to herein, a network-enabled computer may include, but is not limited to: e.g., a computer device, or communications device including, e.g., a server, a network appliance, a personal computer, a workstation, a mobile device, a phone, a handheld PC, a personal digital assistant, a thin client, a fat client, an Internet browser, or other device. One or more client devices 210 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone or like wearable mobile device. In some examples, the client device 210 may be the same as, or similar to, a client device 110 as described with reference to FIG. 1A or FIG. 1B.

Client device 210 may be in communication with one or more servers 220 and 225 via one or more networks 215. Client device 210 may transmit, for example from an application 211 executing on client device 210, one or more requests to one or more servers 220 and 225. The one or more requests may be associated with retrieving data from one or more servers 220 and 225. Servers 220 and 225 may receive the one or more requests from client device 210. Based on the one or more requests from client device 210, one or more servers 220 and 225 may be configured to retrieve the requested data from one or more databases 235. Based on receipt of the requested data from the one or more databases 235, one or more servers 220 and 225 may be configured to transmit the received data to client device 210, the received data being responsive to one or more requests.

System 200 may include one or more hardware security modules (HSM) 230. For example, one or more HSMs 230 may be configured to perform one or more cryptographic operations as disclosed herein. In some examples, one or more HSMs 230 may be configured as special purpose security devices that are configured to perform the one or more cryptographic operations. The HSMs 230 may be configured such that keys are never revealed outside the HSM 230, and instead are maintained within the HSM 230. For example, one or more HSMs 230 may be configured to perform at least one of key derivations, decryption, and MAC operations. The one or more HSMs 230 may be contained within, or may be in data communication with, servers 220 and 225.

System 200 may include one or more networks 215. In some examples, network 215 may be one or more of a wireless network, a wired network or any combination of wireless network and wired network, and may be configured to connect client device 210 to servers 220 and/or 225. For example, network 215 may include one or more of a fiber optics network, a passive optical network, a cable network, a cellular network, an Internet network, a satellite network, a wireless LAN, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, RFID, Wi-Fi, and/or any combination of networks thereof. As a non-limiting example, communications from contactless card 205 and client device 210 may include NFC communication, cellular network between client device 210 and a carrier, and Internet between the carrier and a back-end.

In addition, network 215 may include, without limitation, telephone lines, fiber optics, IEEE Ethernet 802.3, a wide area network, a wireless personal area network, a local area network, or a global network such as the Internet. In addition, network 215 may support an Internet network, a wireless communication network, a cellular network, or the like, or any combination thereof. Network 215 may further include one network, or any number of the exemplary types of networks mentioned above, operating as a stand-alone network or in cooperation with each other. Network 215 may utilize one or more protocols of one or more network elements to which they are communicatively coupled. Network 215 may translate to or from other protocols to one or more protocols of network devices. Although network 215 is depicted as a single network, it should be appreciated that according to one or more examples, network 215 may include a plurality of interconnected networks, such as, for example, the Internet, a service provider's network, a cable television network, corporate networks, such as credit card association networks, and home networks.

In various examples according to the present disclosure, client device 210 of system 200 may execute one or more applications 211, and include one or more processors 212, and one or more card readers 213. For example, one or more applications 211, such as software applications, may be configured to enable, for example, network communications with one or more components of system 200 and transmit and/or receive data. It is understood that although only single instances of the components of client device 210 are illustrated in FIG. 2, any number of devices 210 may be used. Card reader 213 may be configured to read from and/or communicate with contactless card 205. In conjunction with the one or more applications 211, card reader 213 may communicate with contactless card 205. In examples, the card reader 213 may include circuitry or circuitry components, e.g., NFC reader coil, that generates a magnetic field to allow communication between the client device 210 and the contactless card 205.

The application 211 of any of client device 210 may communicate with the contactless card 205 using short-range wireless communication (e.g., NFC). The application 211 may be configured to interface with a card reader 213 of client device 210 configured to communicate with a contactless card 205. As should be noted, those skilled in the art would understand that a distance of less than twenty centimeters is consistent with NFC range.

In some embodiments, the application 211 communicates through an associated reader (e.g., card reader 213) with the contactless card 205.

In some embodiments, card activation may occur without user authentication. For example, a contactless card 205 may communicate with the application 211 through the card reader 213 of the client device 210 through NFC. The communication (e.g., a tap of the card proximate the card reader 213 of the client device 210) allows the application 211 to read the data associated with the card and perform an activation. In some cases, the tap may activate or launch application 211 and then initiate one or more actions or communications with an account server 225 to activate the card for subsequent use. In some cases, if the application 211 is not installed on client device 210, a tap of the card against the card reader 213 may initiate a download of the application 211 (e.g., navigation to an application download page). Subsequent to installation, a tap of the card may activate or launch the application 211, and then initiate (e.g., via the application or other back-end communication) activation of the card. After activation, the card may be used in various transactions including commercial transactions.

According to some embodiments, the contactless card 205 may include a virtual payment card. In those embodiments, the application 211 may retrieve information associated with the contactless card 205 by accessing a digital wallet implemented on the client device 210, wherein the digital wallet includes the virtual payment card. In some examples, virtual payment card data may include one or more static or dynamically generated virtual card numbers.

Server 220 may include a web server in communication with database 235. Server 225 may include an account server. In some examples, server 220 may be configured to validate one or more credentials from contactless card 205 and/or client device 210 by comparison with one or more credentials in database 235. Server 225 may be configured to authorize one or more requests, such as payment and transaction, from contactless card 205 and/or client device 210.

Figure 3A:
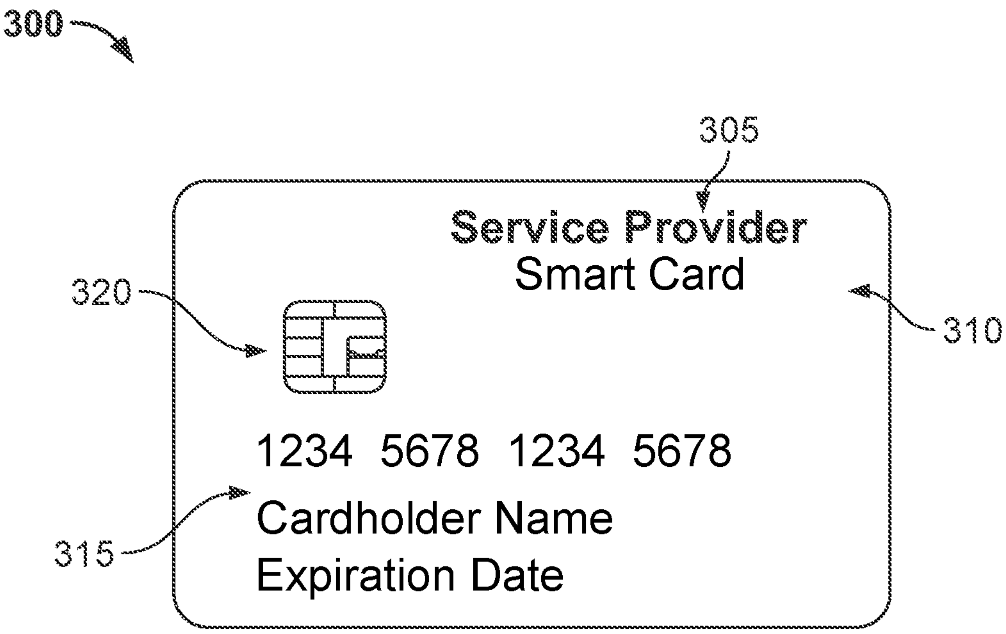
FIG. 3A illustrates an example contactless card in accordance with one or more embodiments.

FIG. 3A illustrates one or more contactless cards 300, which may include a payment card, such as a credit card, debit card, or gift card, issued by a service provider 305 displayed on the front or back of the card 300. In some examples, the contactless card 300 is not related to a payment card, and may include, without limitation, an identification card. In some examples, the payment card may include a dual interface contactless payment card. The contactless card 300 may include a substrate 310, which may include a single layer, or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 300 may have physical characteristics compliant with the ID-1 format of the ISO/IEC 7810 standard, and the contactless card may otherwise be compliant with the ISO/IEC 14443 standard. However, it is understood that the contactless card 300 according to the present disclosure may have different characteristics, and the present disclosure does not require a contactless card to be implemented in a payment card.

The contactless card 300 may also include identification information 315 displayed on the front and/or back of the card, and a contact pad 320. The contact pad 320 may be configured to establish contact with another communication device, such as a user device, smart phone, laptop, desktop, or tablet computer. The contactless card 300 may also include processing circuitry, antenna and other components not shown in FIG. 3A. These components may be located behind the contact pad 320 or elsewhere on the substrate 310. The contactless card 300 may also include a magnetic strip or tape, which may be located on the back of the card (not shown in FIG. 3A).

Figure 3B:
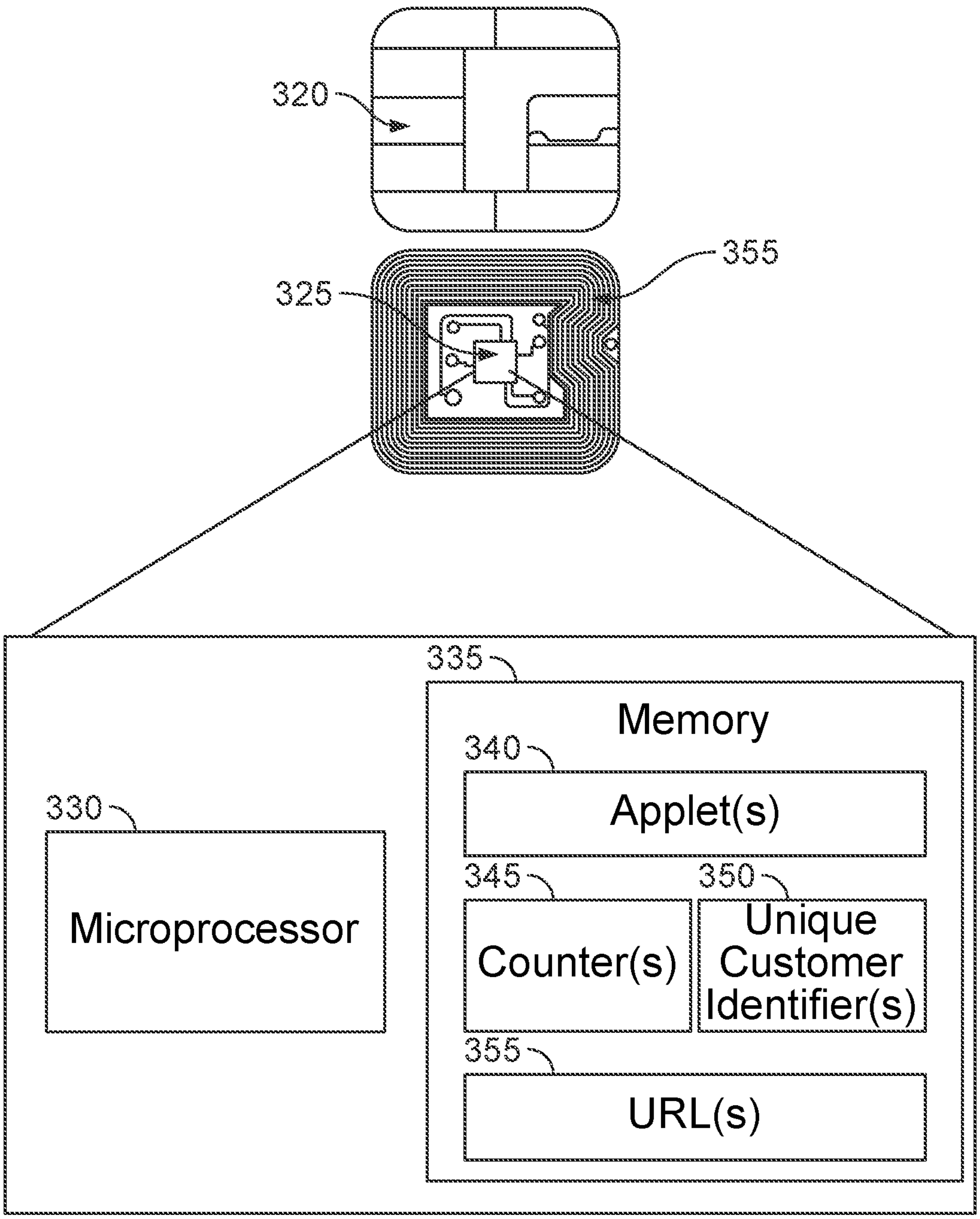
FIG. 3B illustrates an example contact pad of a contactless card in accordance with one or more embodiments.

As illustrated in FIG. 3B, the contact pad 320 of FIG. 3A may include processing circuitry 325 for storing and processing information, including a microprocessor 330 and a memory 335. It is understood that the processing circuitry 325 may contain additional components, including processors, memories, error and parity/CRC checkers, data encoders, anti-collision algorithms, controllers, command decoders, security primitives and tamper-proofing hardware, as necessary to perform the functions described herein.

The memory 335 may be a read-only memory, write-once read-multiple memory or read/write memory, e.g., RAM, ROM, and EEPROM, and the contactless card 300 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

The memory 335 may be configured to store one or more applets 340, one or more counters 345, one or more diversified keys 347, one or more customer identifiers 350, and one or more uniform resource locators (URLs). The one or more applets 340 may include one or more software applications configured to execute on one or more contactless cards, such as Java Card applet. However, it is understood that applets 340 are not limited to Java Card applets, and instead may be any software application operable on contactless cards or other devices having limited memory. The one or more counters 345 may include a numeric counter sufficient to store an integer. As will be further described below, the one or more diversified keys 347 may be used to encrypt various information, such as information about the user or customer (e.g., customer identifier 450) to generate cryptogram(s) that can be sent to, for example, a mobile device for at least authentication purposes. The customer identifier 350 may include a unique alphanumeric identifier assigned to a user of the contactless card 300, and the identifier may distinguish the user of the contactless card from other contactless card users. In some examples, the customer identifier 350 may identify both a customer and an account assigned to that customer and may further identify the contactless card associated with the customer's account. The one or more URLs 355 may include unique addresses associated with a World Wide Web page or the like, and in some instance, may be generated by the processing circuitry 325 based on a URL generation event (e.g., the card 300 is tapped to a computing device).

The processor and memory elements of the foregoing exemplary embodiments are described with reference to the contact pad, but the present disclosure is not limited thereto. It is understood that these elements may be implemented outside of the pad 320 or entirely separate from it, or as further elements in addition to processor 330 and memory 335 elements located within the contact pad 320.

In some examples, the contactless card 300 may include one or more antennas 355. The one or more antennas 355 may be placed within the contactless card 300 and around the processing circuitry 325 of the contact pad 320. For example, the one or more antennas 355 may be integral with the processing circuitry 325 and the one or more antennas 355 may be used with an external booster coil. As another example, the one or more antennas 355 may be external to the contact pad 320 and the processing circuitry 325.

In an embodiment, the coil of contactless card 300 may act as the secondary of an air core transformer. The terminal may communicate with the contactless card 300 by cutting power or amplitude modulation. The contactless card 300 may infer the data transmitted from the terminal using the gaps in the contactless card's power connection, which may be functionally maintained through one or more capacitors. The contactless card 300 may communicate back by switching a load on the contactless card's coil or load modulation. Load modulation may be detected in the terminal's coil through interference.

As explained above, the contactless cards 300 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader, and produce an NDEF message that includes a cryptographically secure OTP encoded as an NDEF text tag.

In examples, when preparing to send data (e.g., to a mobile device, to a server, etc.), the contactless card 300 may increment a counter value of a counter of the one or more counters 345. The contactless card 300 may then provide a master key, which may be a distinct key stored on the card 300, and the counter value as input to a cryptographic algorithm, which produces a diversified key as output, which may be one of the diversified keys 347. It is understood that the master key and the counter value is also stored in memory of a device or component receiving data from the contactless card 300 so as to decrypt the data using the diversified key that was used by the card to encrypt the transmitted data. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES128; a symmetric HMAC algorithm, such as HMAC-SHA-256; and a symmetric CMAC algorithm such as AES-CMAC. The contactless card 300 may then encrypt the data (e.g., the customer identifier 350 and any other data) using the diversified key in the form of one or more cryptograms that can be sent to a mobile device, for example, as NFC data exchange format (NDEF) messages. The contactless card 300 may then transmit the encrypted data (e.g., cryptograms) to the mobile device, which can then decrypt the cryptograms using the diversified key (e.g., the diversified key generated by the mobile device using the counter value and the master key stored in memory thereof).

Figure 4:
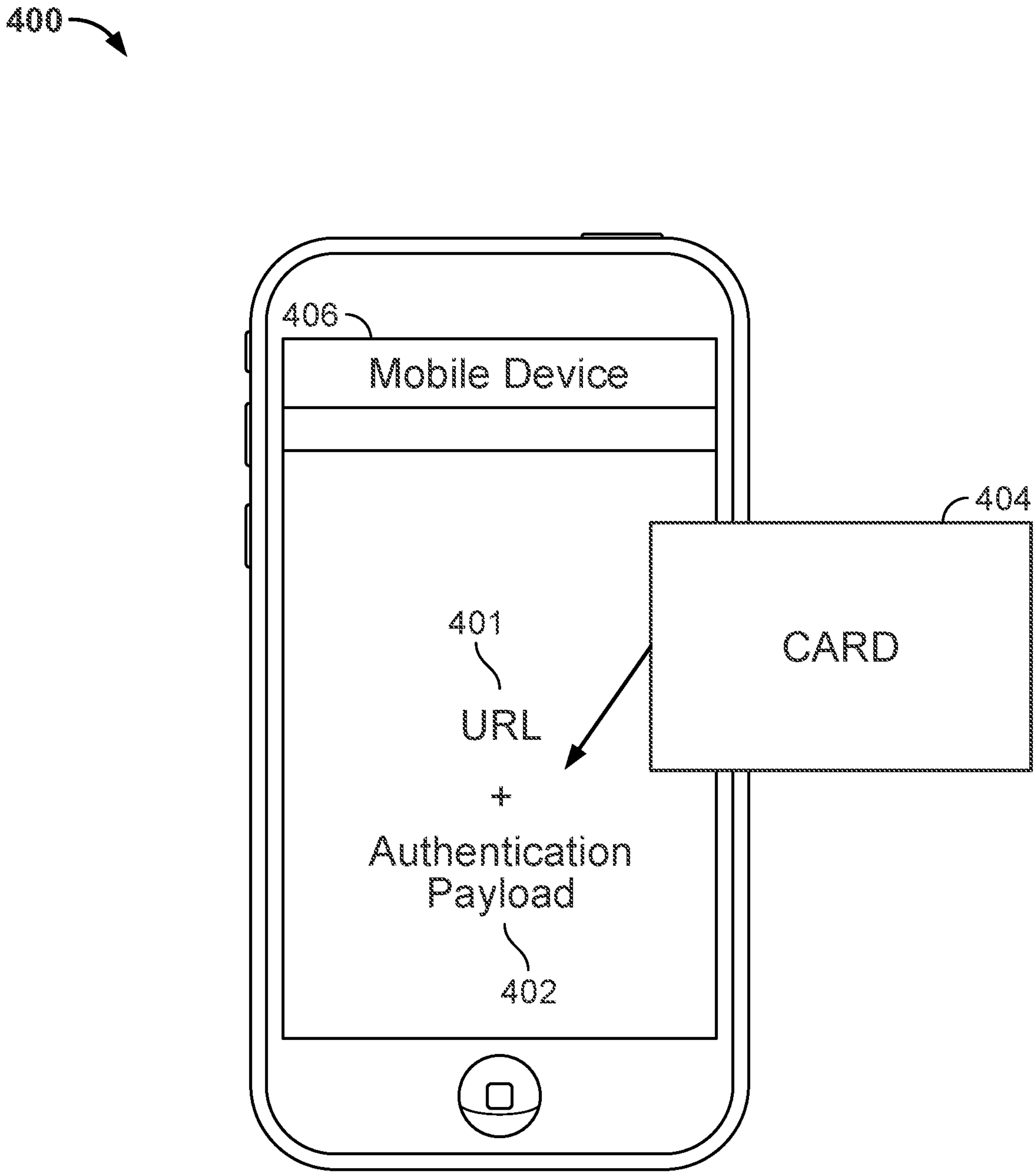
FIG. 4 illustrates an example reading of a URL and an authentication payload in accordance with one or more embodiments.

FIG. 4 illustrates an example reading 400 of a URL and an authentication payload by a mobile device according to one or more embodiments. As shown, a contactless card 404

(which may be similar or identical to the contactless card 300 described above) may be tapped or brought near a mobile device 406. This action of tapping or brining the contactless card 404 near the mobile device 406 allows the contactless card 404 to enter or be within a magnetic field generated by an NFC reader coil of the mobile device 406, which causes or signals the card 404 to perform an action.

In response, the contactless card 404, for instance, may generate and transmit a URL 401 and an authentication payload 402 (e.g., cryptogram containing a customer identifier 350) to the mobile device 406. In some examples, the contactless card 404 may just transmit the URL and authentication payload if the URL (e.g., URLs 355 may be already stored in contactless card 300) and authentication payload have been already generated and stored in the card 404. It may be understood that the authentication payload 402 may be a cryptogram and sent by the contactless card as an NFC data exchange format (NDEF) message. It may further be understood that a cryptogram may broadly refer to any encrypted text, data, or information.

As will be further described below, upon reading the URL 401 and authentication 402, the mobile device 404 may be configured to communicate with one or more APIs (e.g., authentication APIs) or one or more servers (e.g., backend authentication servers) via the URL 401 to authenticate the user based the acquired authentication payload 402. The URL 401 may be a web address specifying the one or more API endpoints or the location of the one or more servers.

Moreover, it may be understood that the contactless card 404 does not have to be tapped or brought near a specific area on the mobile device 406, but it may be tapped or brought near any physical area or portion of the mobile device 406 for the mobile device 406 to accurately read the URL and authentication payload from the contactless card 404. It may further be understood that the above reading 400 does not require that a banking app be already installed on the mobile device 406 for the mobile device 406 to receive the URL 401 and authentication code 402.

Figure 5:
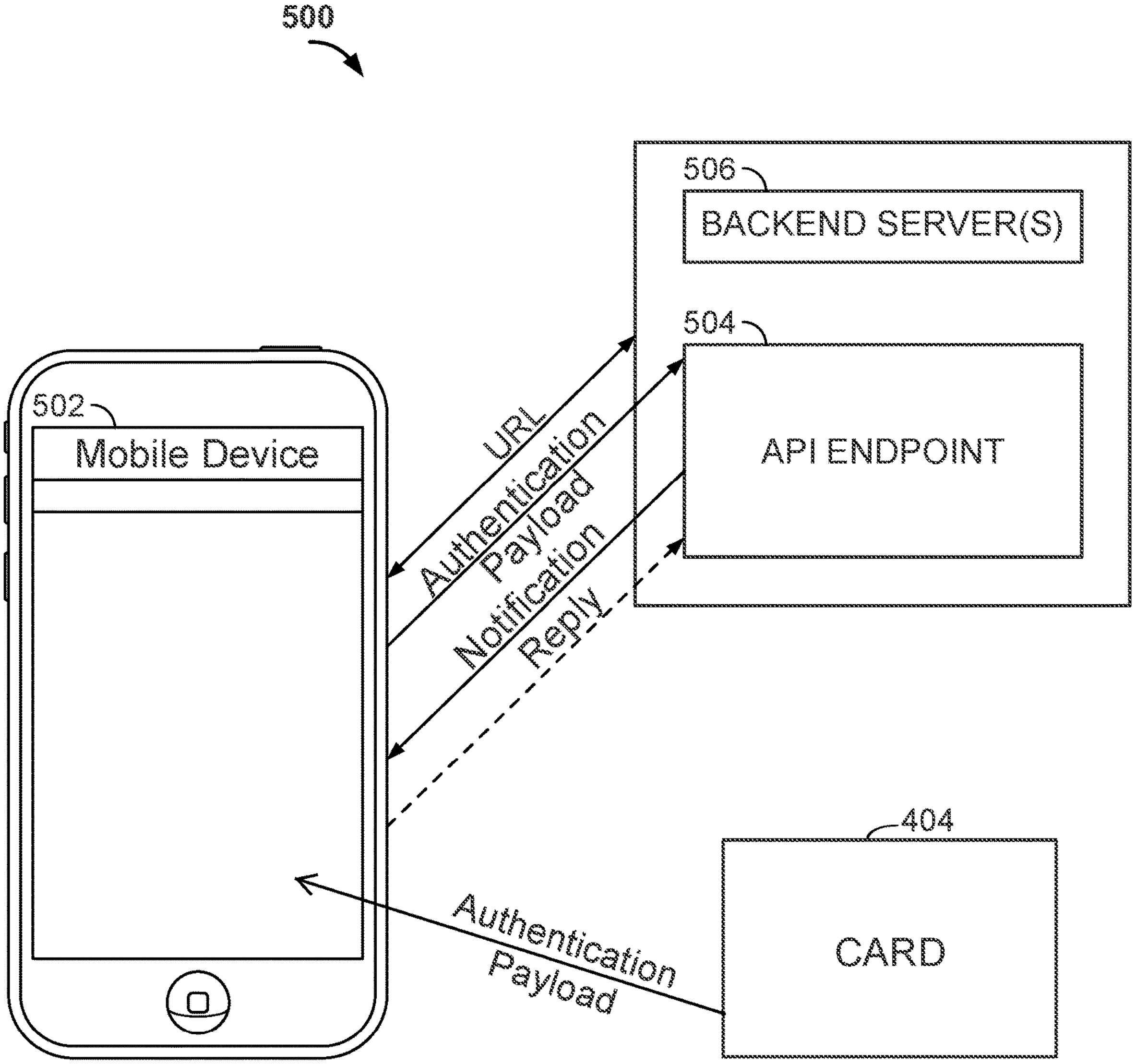
FIG. 5 illustrates an example communication between a computing device and an API endpoint in accordance with one or more embodiments.

FIG. 5 illustrates an example communication 500 between a computing device 502 and API endpoint 504 according to one or more embodiments and based on the exchange conducted between the contactless card 404 and the computing device 502, as discussed in FIG. 4. The computing device 502 may be user mobile device, such as mobile device 406 or any other suitable device (e.g., smartphone, laptop, tablet computer, wearable computer, etc.). The API endpoint 504 may be an authentication API, which may be run, executed, or supported by one or more backend servers 506.

As described and as shown, the computing device 502 may use the URL read from the contactless card to locate and establish communication with the API endpoint 504. Upon establishing communication, the computing device 502 may provide the API endpoint 504 an authentication payload also read from the contactless card. In examples, the authentication payload may be a cryptogram (e.g., authentication payload is encrypted) and include at least customer information, such as a customer identifier (e.g., customer identifier 350 stored in contactless card 300). The customer identifier may be a unique identifier (e.g., alphanumeric string, personally identifiable information, etc.) that associates an authorized user to the contactless card and this association may at least be verifiable at least at the API endpoint 504.

According to examples, the API endpoint 504 may be configured to receive and decrypt the authentication payload using at least one key (e.g., a private key, a decryption key, a key corresponding to a specific encryption-decryption scheme). Information contained in the authentication payload, such as the customer identifier, may be compared or matched against user authentication information kept and maintained on the backend side. For instance, the authentication information may be any type of data or information used to properly identify and authenticate the user (e.g., ID number, customer number, personally identifiable information, etc.) on the backend side of the authentication process. Thus, if the decrypted customer identifier and the user authentication information match, the user may be successfully authenticated.

As further illustrated in FIG. 5, upon successful authentication or verification of the user, the API endpoint 504 may perform (or it may cause other APIs or other servers to perform) one of at least two actions based on the user's card tap configuration. In one example, the API endpoint 504 may determine if a single tap of the user's card has been preconfigured (e.g., preconfigured to perform one-tap bill pay) and may determine if a single tap event has occurred (e.g., the API endpoint 504 receiving the authentication payload may indicate or qualify as the single tap event). If the user has preconfigured a single tap of the card to act or function as a card payment of a predefined value (e.g., minimum payment, half of balance payment, full balance payment, percentage of balance payment, etc.), the API endpoint 504 may cause the predefined payment to be automatically processed. Thereafter, the user may be notified that the predefined payment was successfully paid and applied to the card balance. As will be further described below, the card tap may be configured by the user to mean or function as various things in a banking app, one of which may be the one-tap bill pay experience.

In another example, if the user has not preconfigured the card tap, the API endpoint 504 may perform (or it may cause other APIs or other servers to perform) a lookup of the user's contact information (e.g., mobile telephone number, e-mail, social media account, etc.) and send the user a notification (e.g., text, e-mail, app notification, etc.) asking whether a payment should be made on the card and how much (e.g., payment amount input request). The user can easily reply to the message (as shown by the dashed arrow) with a simple payment instruction (e.g., pay minimum, pay half of balance, pay full balance, pay a certain percentage of the balance) using the message itself, as will be further described below.

One of the numerous advantages of the one-tap bill pay experience described above is that the URL and authentication payload mechanisms allow the entire authentication and payment processes to be automatically completed by a single tap of the card without first opening a banking app or direct involvement of the banking app, which makes the payment experience much easier and more convenient for the user compared to payment experiences involving multi-factor authentication and further enables a practical service for the user.

Figure 6:
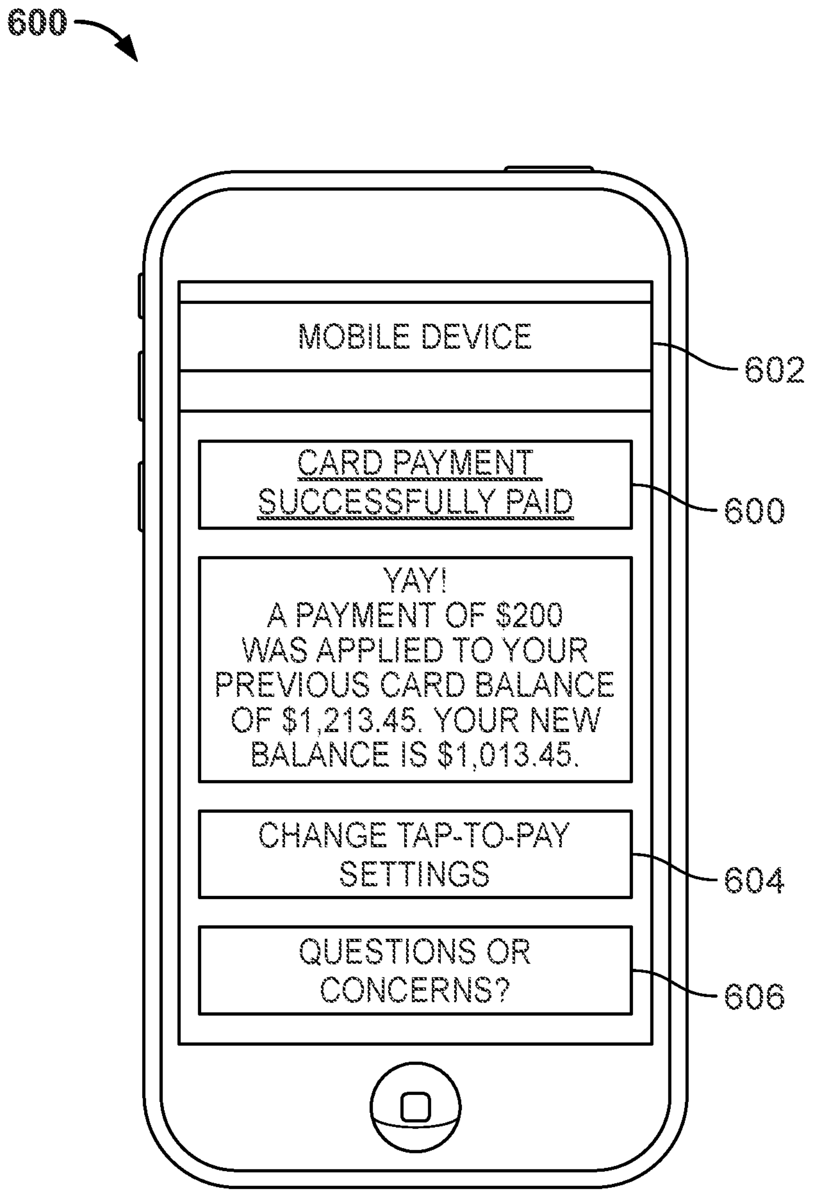
FIG. 6 illustrates an example of a first message in accordance with one or more embodiments.

FIG. 6 illustrates an example message 600 displayed on a user mobile device 602 according to one or more embodiments. In examples, a user may have already preconfigured a single tap of a card to function as a payment of a specific amount or value, e.g., 200 dollars, towards the card balance. Thus, when the user taps the card to the user mobile device 602, the payment of 200 dollars may be automatically processed (via the above described URL and authentication payload mechanisms). Upon successful payment, the message 600 may be sent and displayed on the user mobile device 602.

As shown, the message 600 may display a simple message, such as "Yay! A payment of $200 was applied to your previous card balance of $1,213.45. Your new balance is $1,013.45." The message 600 may be any form of notification, such as an e-mail, text message, an app notification, etc. Other ways of notifying the user is possible, such as an automated telephone call.

Further shown are at least two icons 604 and 606 at the bottom of the message 600. In examples, icon 604 may be selected by the user if the user desires to change any aspect of the one-tap bill pay experience, such as the predefined payment amount. If icon 604 is selected, the user may be prompted to a banking app, where changes to the one-tap bill pay features can be changed in the banking app.

In further examples, icon 606 may be selected by the user if the user has any questions or concerns about the content displayed in the message 600 or anything related to the one-tap bill pay experience. By selecting icon 606, the user may be automatically connected to an appropriate banking representative via a messaging app (of the banking app), telephone, or the like.

Figure 7:
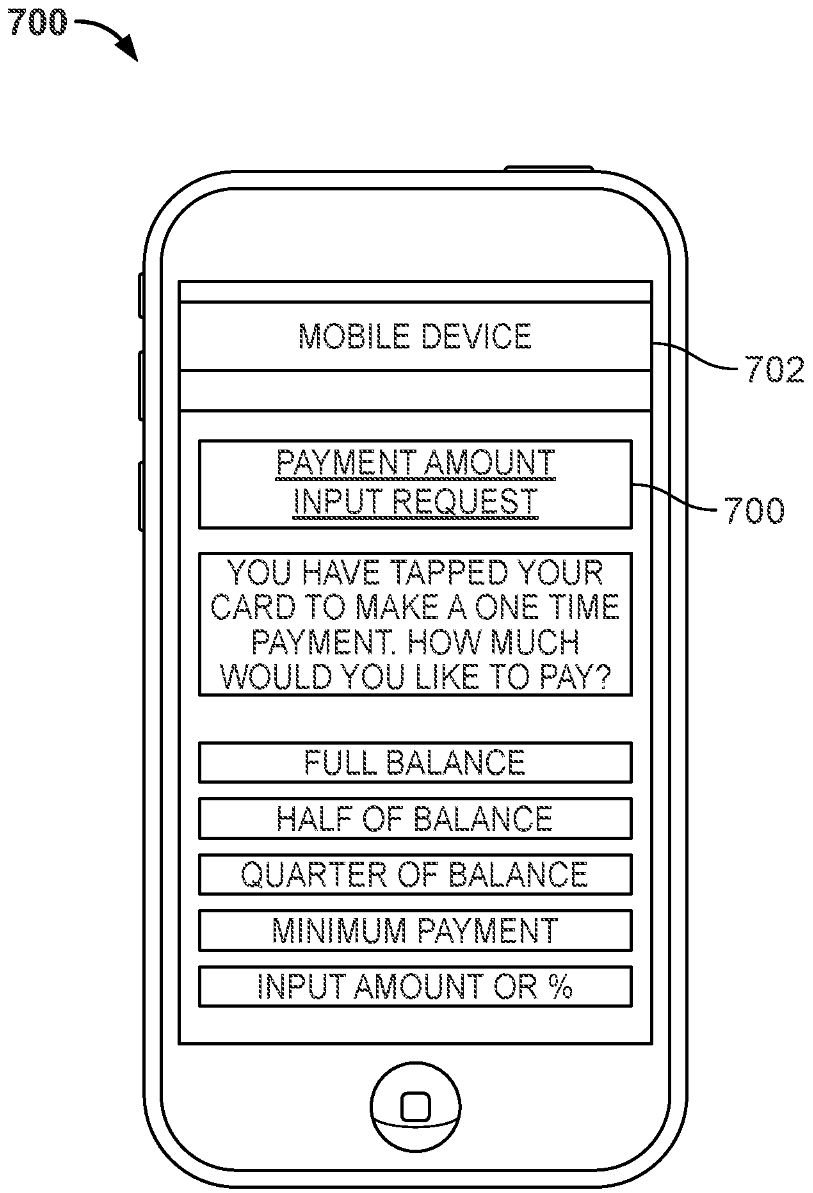
FIG. 7 illustrates an example of a second message in accordance with one or more embodiments.

FIG. 7 illustrates an example message 700 displayed on a user mobile device 702 according to one or more embodiments. In examples, message 700 may be a type of message a user receives during the one-tap bill pay experience if the user has not already preconfigured the single tap of a card to mean payment of a specific amount of value.

When the user taps the card to the user mobile device 702, the message 700 regarding payment may be generated on the backend side of the system (e.g., via the one or more API endpoints handling authentication) and sent to the user mobile device 702. The message 700 may be any type of notification, such as an e-mail, text message, app notification, etc.

As shown, the message 700 may recite "How much would you like to pay towards your credit card balance?" This inquiry or other similar examples may otherwise be referred as a payment amount input request. Under that portion of the message, one or more payment amount options may be presented to the user. For example, the user may pay the full balance, half the balance, a quarter of the balance, or minimum payment. In some examples, the user may input or enter directly in the message a custom amount to be paid toward the card balance in response to the message 700, such as a specific amount or a particular percentage of the balance. For purposes of simplicity, typically only a few options may be presented to the user in the message 700.

Upon responding to the message 700 with a payment option (e.g., payment amount input by the user), the user may receive a subsequent message (not shown) indicating that the payment has been successfully applied to the balance. In examples, the subsequent message may be similar to message 600 in that at least information relating to the current balance of the card along with options to set up or change card tap configurations in a banking app or to communicate with a representative may be displayed.

Figure 8:
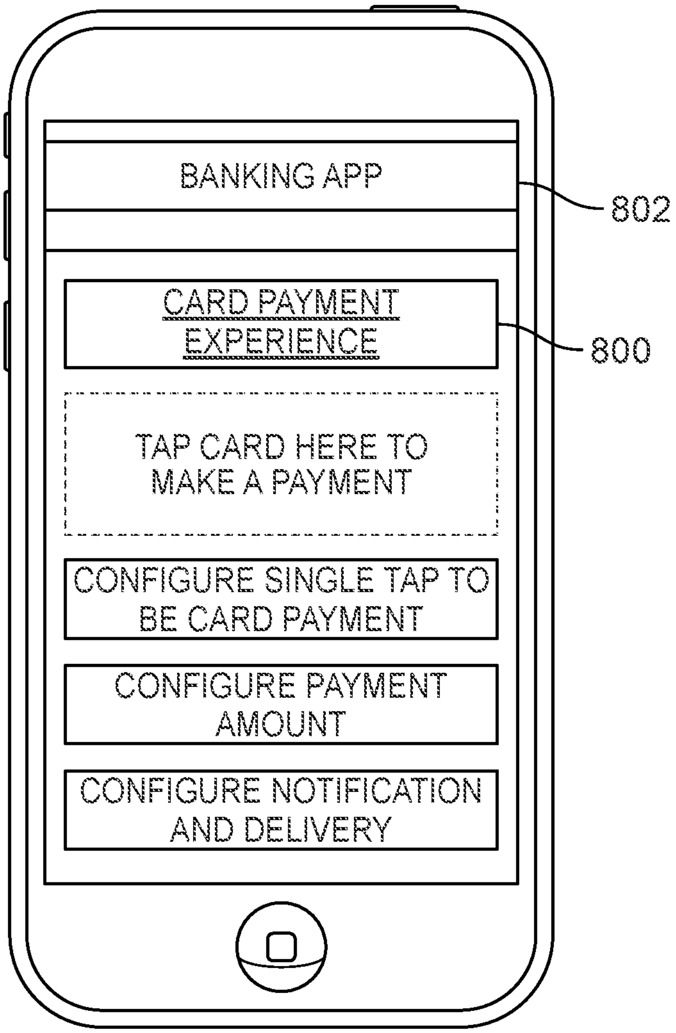
FIG. 8 illustrates an example payment experience in a banking app in accordance with one or more embodiments.

FIG. 8 illustrates a payment experience 800 on a banking app 802 according to one or more embodiments. The card payment experience 800 via the banking app 802 may be different from the one-tap bill pay experience described above in that the user may first be required to login to the banking app 802 prior to initiating card payment. In examples, the user may login to the app 802 via one-tap sign-in (e.g., user taps contactless card to the mobile device and banking app automatically authenticates and logs in). The user's card may then be tapped to the user's mobile device again to make a card payment. While the payment experience 800 can involve multiple card taps, the banking app 802 offers greater user flexibility and customization during the experience, as will be described below. Moreover, by virtue of the user having to login to the banking app 802, there is an added layer of security for the payment process.

As shown, in addition to tapping the card to make the payment, the user may be able to customize all sorts of features associated with the payment experience 800 on an interface of the banking app 802. For example, first, the user may be able to configure a single tap of the card (for use and detection outside of the banking app) to mean one-tap bill pay. It may be understood that, in other instances, the user may be able to configure the single tap of the card to mean other actions. In this instance, however, the user may configure it to function as one-tap bill pay. The user may also be able to set a predefined amount for the one-tap bill pay experience. Moreover, the user may be able to customize or configure how notifications are delivered.

Figure 9:
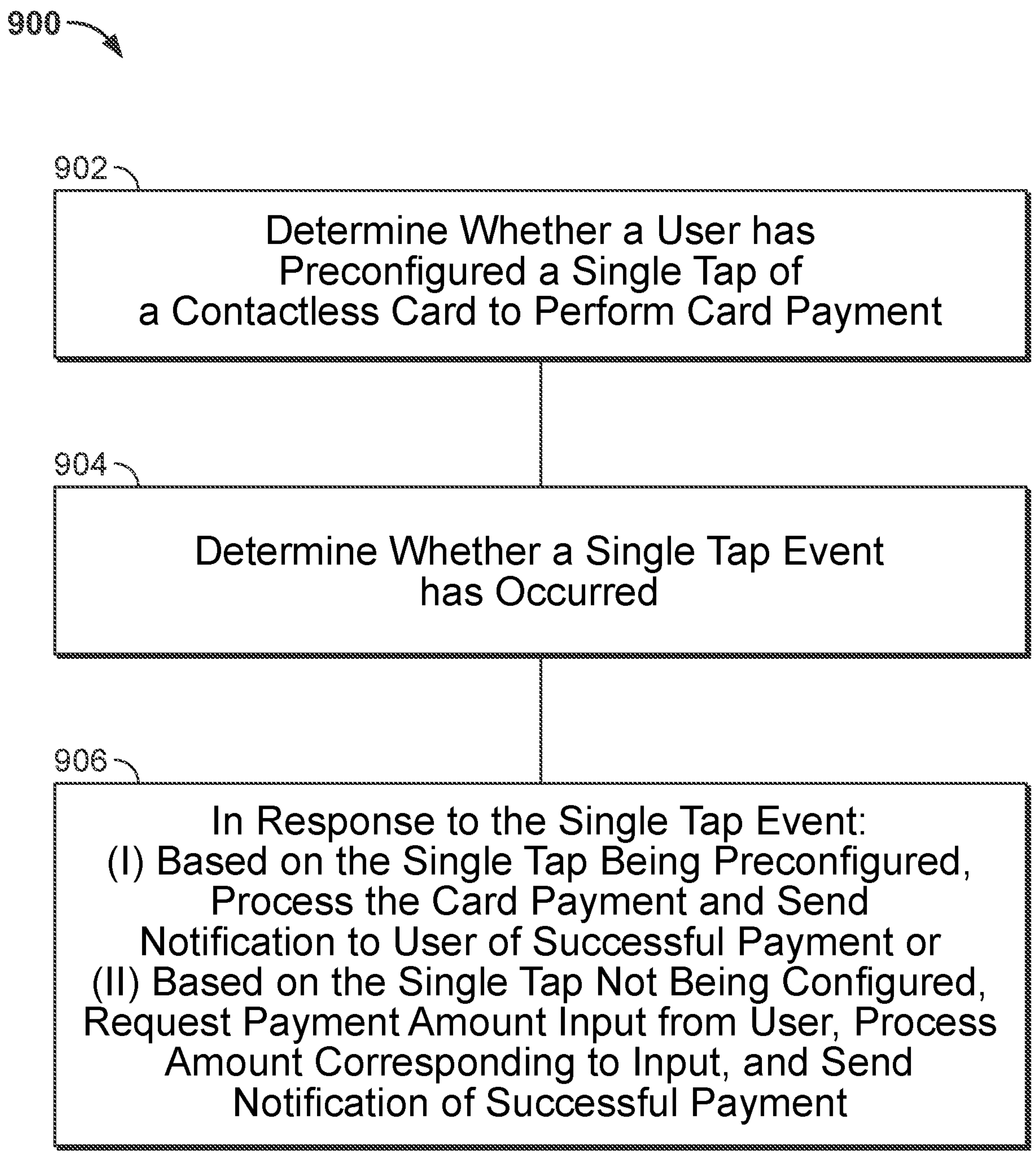
FIG. 9 illustrates an example flow diagram in accordance with one or more embodiments.

FIG. 9 illustrates an example flow diagram 900 according to one or more embodiments. The flow diagram 900 is related to the one-tap bill pay experience described above. It may be understood that the blocks of the flow diagram 900 and the features described therein are not required to be performed in any particular order. Moreover, it may be understood that the flow diagram 900 and the features described therein may be executed or supported by one or more processors. In examples, the flow diagram 900 may be at least implemented on the API endpoint or backend server side of the one-tap bill pay process.

At block 902, it may be determined whether a user has preconfigured a single tap of a contactless card to perform card payment. As described above, whether the user has preconfigured the one-tap of the card to function as one-tap bill pay will determine whether a predefined payment will be automatically applied to a card balance or whether payment input will be required from the user. In examples, user configurations and settings related to the single tap or one-tap of the contactless card may be stored or saved on the backend-side of the system. Thus, when an authentication payload containing a customer identifier is received and decrypted, the identifier can be matched with customer information, including the single tap or one-tap configurations.

At block 904, it may be determined whether a single tap event has occurred. As described above, when the user taps a contactless card to the user's mobile device, a URL and an authentication payload may be sent to the device. The device then communicates with one or more API endpoints via the URL and provides the API endpoint(s) the authentication payload. To at least that end, in one example, the reception of the authentication payload by the API endpoint(s) may at least indicate that the single tap event has occurred (e.g., the user has tapped the contactless card to the mobile device).

At block 906, in response to the occurrence of the single tap event, one of at least two events may occur. In one example, based on the determination that the user has preconfigured the single tap of the contactless card to perform the card payment, the card payment may be automatically processed without further action from the user. The user may receive a notification that the user predefined payment was successfully applied to the card balance.

In another example, based on the determination that the user has not preconfigured the single tap of the contactless card to perform the card payment, a notification may be sent to the user requesting input regarding payment amount. As described above, the notification may include payment options (e.g., pay full balance, pay half balance, pay minimum, pay a certain percentage) that are easily selectable by the user right in the notification. The payment amount input may then be received and the card payment corresponding the specified payment amount may be processed. Another notification indicating that the payment was successfully applied to the card balance may be sent to the user. Moreover, in some examples, the subsequent notification may also inquire whether the user would like to configure the single tap or one-tap to function as one-tap bill pay in a banking app.

As described above, the one-tap bill pay experience is advantageous at least because a payment of a predefined amount may automatically be processed by a single tap of a contactless card to the user's computing device. In at least that regard, the payment experience is easy and engaging for the user. Another advantage of the disclosure is that the user may also be able to make card payments with a card tap within a banking app, which adds additional layers of security, flexibility, and customizability as described above.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus comprising:

memory to store instructions; and one or more processors, coupled with the memory, operable to execute the instructions that, when executed, cause the one or more processors to:

display, on a display associated with the apparatus, an option to configure a single tap by a contactless card;

receive input configuring the single tap by the contactless card for a card payment of a specific payment amount;

send the single tap configuration associated with the contactless card to a backend server;

after the single tap configuration is sent, detect, via a communication interface, the contactless card;

receive, via the communication interface, a link and an authentication payload from the contactless card, wherein the link specifies a location to authenticate the authentication payload;

send the authentication payload to an authentication server based on the link and request a card payment for the contactless card, and the authentication server is configured to determine whether the authentication payload is authentic or not; and receive an indication that the authentication payload is authenticated, and the card payment for the contactless card is processed for the specific payment amount associated with the single tap configuration.

2. The apparatus of claim 1, wherein the location is an application programming interface (API) endpoint.

3. The apparatus of claim 1, wherein the link is a uniform resource locator (URL).

4. The apparatus of claim 1, wherein the authentication payload is a cryptogram comprising a unique identifier and a counter value.

5. The apparatus of claim 4, wherein the cryptogram is encrypted by the contactless card utilizing diversified keys generated by the contactless card.

6. The apparatus of claim 4, wherein the counter value is based on a number of read operations performed with the contactless card.

7. The apparatus of claim 1, further comprising the display and an input device, the one or more processors further configured to execute instructions to:

receive, from the authentication server, a message prior to reception of the input configuring the single tap, the message comprising an option to determine an amount for the card payment;

display, on the display, the option to determine an amount for the card payment;

receive, by the input device, a user selection indicating a determined amount for the card payment; and send, to the authentication server, a response message comprising the determined amount for the card payment.

8. The apparatus of claim 1, wherein at least a portion of the instructions are implemented as a mobile application.

9. The apparatus of claim 8, wherein the one or more processors are further configured to:

process a login procedure for the mobile application; and enable operations to detect, receive, send, and receive upon successful completion of the login procedure; or prevent the operations upon failure of the login procedure.

10. The apparatus of claim 1, wherein the indication indicates that the card payment for the contactless card is for a one-tap preconfigured payment amount.

11. A computer-implemented method, comprising:

displaying, on a display associated with an apparatus, an option to configure a single tap by a contactless card;

receiving input configuring the single tap by the contactless card for a card payment of a specific payment amount;

sending the single tap configuration associated with the contactless card to a backend server;

after the single tap configuration is sent, detecting, via a communication interface, the contactless card;

receiving, via the communication interface, a link and an authentication payload from the contactless card, wherein the link specifies a location to authenticate the authentication payload;

sending the authentication payload to an authentication server based on the link and request a card payment for the contactless card, and the authentication server is configured to determine whether the authentication payload is authentic or not; and receiving an indication that the authentication payload is authenticated, and the card payment for the contactless card is processed for the specific payment amount associated with the single tap configuration.

12. The computer-implemented method of claim 11, wherein the location is an application programming interface (API) endpoint.

13. The computer-implemented method of claim 11, wherein the link is a uniform resource locator (URL).

14. The computer-implemented method of claim 11, wherein the authentication payload is a cryptogram comprising a unique identifier and a counter value.

15. The computer-implemented method of claim 14, wherein the cryptogram is encrypted by the contactless card utilizing diversified keys generated by the contactless card.

16. The computer-implemented method of claim 14, wherein the counter value is based on a number of read operations performed with the contactless card.

17. The computer-implemented method of claim 11, comprising:

receiving a message prior to reception of the input configuring the single tap, the message comprising an option to determine an amount for the card payment;

displaying, via the display, the option to determine an amount for the card payment;

receiving, via an input device, a user selection indicating a determined amount for the card payment; and sending a response message comprising the determined amount for the card payment.

18. The computer-implemented method of claim 11, comprising:

providing a mobile application to perform one or more of the detecting, the receiving the link and the authentication payload, the sending the authentication payload, and the receiving the indication.

19. The computer-implemented method of claim 18, comprising:

processing a login procedure for the mobile application; and enabling performing operations of the detecting, the receiving the link and the authentication payload, the sending the authentication payload, and the receiving the indication upon successful completion of the login procedure; or preventing the operations upon failure of the login procedure.

20. The computer-implemented method of claim 11, wherein the indication indicates that the card payment for the contactless card is for a one-tap preconfigured payment amount.

* * * * *